US008787770B2

(12) United States Patent
Arao

(10) Patent No.: US 8,787,770 B2
(45) Date of Patent: Jul. 22, 2014

(54) TRANSPORT APPARATUS

(75) Inventor: Hideaki Arao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/656,276

(22) Filed: Jan. 22, 2010

(65) Prior Publication Data
US 2010/0135658 A1 Jun. 3, 2010

Related U.S. Application Data

(63) Continuation of application No. PCT/JP2007/065867, filed on Aug. 14, 2007.

(51) Int. Cl.
*H04B 10/27* (2013.01)

(52) U.S. Cl.
USPC .............................. 398/166; 398/25

(58) Field of Classification Search
None
See application file for complete search history.

(56) References Cited

U.S. PATENT DOCUMENTS

| 6,175,557 | B1 * | 1/2001 | Diachina et al. | 370/313 |
| 7,567,564 | B2 | 7/2009 | Tanaka | |
| 2002/0097954 | A1 * | 7/2002 | Maeno | 385/24 |
| 2003/0128987 | A1 * | 7/2003 | Mayer | 398/98 |
| 2003/0210701 | A1 | 11/2003 | Saiki et al. | |
| 2005/0265329 | A1 | 12/2005 | Havala et al. | |
| 2007/0086333 | A1 | 4/2007 | Doukai et al. | |
| 2010/0303456 | A1 * | 12/2010 | Matsukawa et al. | 398/8 |

FOREIGN PATENT DOCUMENTS

| EP | 0559091 | 9/1993 |
| JP | 2005-341591 | 12/2005 |
| JP | 2007-60438 | 3/2007 |
| JP | 2007-116275 | 5/2007 |
| WO | 02/45352 | 6/2002 |
| WO | 02/095998 | 11/2002 |

OTHER PUBLICATIONS

International Search Report for PCT/JP2007/065867, mailed Oct. 16, 2007.
Extended European Search Report dated May 15, 2012 issued in corresponding European Patent Application No. 07792510.5.

* cited by examiner

*Primary Examiner* — Nathan Curs
(74) *Attorney, Agent, or Firm* — Staas & Halsey LLP

(57) ABSTRACT

A transport apparatus includes a plurality of transport processing units. The transport processing unit transports optical signals on an optical network which controls, by transmitting or receiving the optical signals including control information, apparatuses that are managed on the basis of areas. The transport processing unit includes a setting-information storage unit that stores therein setting information indicating a group to which a plurality of apparatuses within the area belongs, a frame generating unit that, upon receiving the optical signal, determines on the basis of the setting information whether the control information is to be terminated or to be passed through itself, sets a destination depending on the result of the determination, and generates a frame including the control information, and a path switching unit that switches a path of the frame on the basis of the destination of the frame.

3 Claims, 12 Drawing Sheets

FIG.4

| PREAMBLE/SFD | INTERNAL DA | INTERNAL SA | INTERNAL VLAN | TYPE | DATA/(PAD) | | | FCS |
|---|---|---|---|---|---|---|---|---|
| | | | | | LOGICAL NO | LENGTH | HDLC FRAME/(PAD) | |

FIG.5

| DCC CHANNEL NUMBER | PHYSICAL PORT | DCC TYPE |
|---|---|---|
| 1 | 1 | SECTION DCC |
| 2 | 2 | SECTION DCC |
| 3 | 3 | SECTION DCC |
| 4 | 4 | SECTION DCC |
| 5 | 5 | SECTION DCC |
| 6 | 6 | SECTION DCC |
| 7 | 7 | SECTION DCC |
| 8 | 8 | SECTION DCC |
| 9 | 1 | LINE DCC |
| 10 | 2 | LINE DCC |
| 11 | 3 | LINE DCC |
| 12 | 4 | LINE DCC |
| 13 | 5 | LINE DCC |
| 14 | 6 | LINE DCC |
| 15 | 7 | LINE DCC |
| 16 | 8 | LINE DCC |

FIG.6

| LOGICAL NO. | GROUP IDENTIFICATION INFORMATION | DESTINATION MAC ADDRESS (DA) | | SOURCE MAC ADDRESS | SETTING INFORMATION | |
| --- | --- | --- | --- | --- | --- | --- |
| | | OPERATION SYSTEM | STAND-BY SYSTEM | | VLAN IDENTIFICATION INFORMATION | TYPE |
| 1001 | GROUP 1 | A1 | B1 | C1 | xxxx | xx |
| 1002 | GROUP 2 | A2 | B2 | C2 | xxxx | xx |
| ... | ... | ... | ... | ... | ... | ... |

TRANSPORT APPARATUS

CROSS-REFERENCE TO RELATED APPLICATION(S)

This application is a continuation of International Application No. PCT/JP2007/65867, filed on Aug. 14, 2007, the entire contents of which are incorporated herein by reference.

FIELD

The embodiments discussed herein are directed to a transport apparatus and a transport method for transporting optical signals on an optical network for controlling apparatuses that are managed on the basis of areas, by transmitting or receiving the optical signals including control information.

BACKGROUND

In recent years, on a SONET/SDH (Synchronous Optical NETwork/Synchronous Digital Hierarchy) network, a monitor/control system for monitoring/controlling a plurality of transport apparatuses (NE; Network Element) constitutes a DCN (Data Communication Network) (e.g., see International Publication Pamphlet No. WO2002/045352). FIG. 9 is a diagram illustrating a configuration of a conventional DCN.

As illustrated in FIG. 9, NEs in the DCN are managed based on areas. The areas 10 to 30 include gateway apparatuses (GNE) 11, 21, and 31 for transmission among areas. In each area, NEs 12 to 14, 22 to 24, and 32 to 34 can be managed. With the structure illustrated in FIG. 9, monitoring control information (information for monitoring or controlling NEs) can be transmitted among all NEs within the DCN. Furthermore, because the NEs are divided and managed based on each of the areas, the NEs are managed in a less complex way.

Because the NEs are divided and managed on the basis of each of the areas as illustrated in FIG. 9, the NEs are managed in a less complex way. The problem is that there is a limit to the number of NEs that can be managed in each area, and when the number of NEs connected is above this limit, transmission among the connected NEs is lost and thus the NEs are no longer monitored.

In order to solve the above-mentioned problems, there is an attempt, when the number of NEs connected is above the limit within the DCN, to divide the DCN so that the number of NEs that can be managed is increased. To divide the DCN, each NE does not terminate, at its own NE, the monitoring control information that is received from the NEs belonging to the DCN to be divided but transmits the monitoring control information to other NEs that are to be divided.

FIG. 10 is a diagram illustrating a division of the DCN (omitting GNE in FIG. 10). In the example illustrated in FIG. 10, NEs 41 to 46 included in the area 40 are divided into a group of NEs 41 to 44 (DCN 40a) and a group of NEs 45 and 46 (DCN 40b).

In the DCN divided as illustrated in FIG. 10, the NE 44 terminates, upon receiving monitoring control information from the NEs 41 to 43, the monitoring control information. When the NE 44 receives the monitoring control information from the NEs 45 and 46, the NE 44 passes the received monitoring control information through it (i.e., the NE 44 passes the monitoring control information received from the NE 45 through it to the NE 46 and passes through the monitoring control information received from the NE 46 through it to the NE 45).

To provide a diversity of customer services, it is demanded that the NE described above be able to flexibly change a configuration of transport apparatuses in harmony with various types of services. There have been developed a centralized control configuration that performs termination/monitoring control with a single termination processing unit and a dispersed control configuration that performs termination/monitoring control with a plurality of termination processing units.

However, dividing the DCN under the centralized control configuration causes an increase in processing load on the NE (transport apparatus), and dividing the DCN under the dispersed control configuration, to lessen processing load, causes an increase in complexity of signal wires within the NEs.

There is a significant demand that the division of DCN be introduced with an advantage of the dispersed control configuration that can disperse processing load and without an increase in complexity of signal wires within the NEs.

SUMMARY

According to an aspect of an embodiment of the invention, a transport apparatus includes a plurality of transport processing units. The transport processing unit transports optical signals on an optical network which controls, by transmitting or receiving the optical signals including control information, apparatuses that are managed on the basis of areas. The transport processing unit includes a setting-information storage unit that stores therein setting information indicating a group to which a plurality of apparatuses within the area belongs, a frame generating unit that, upon receiving the optical signal, determines on the basis of the setting information whether the control information is to be terminated or to be passed through itself, sets a destination depending on the result of the determination, and generates a frame including the control information, and a path switching unit that switches a path of the frame on the basis of the destination of the frame.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an exemplary data structure of an ether frame;

FIG. 5 is a diagram illustrating a relation among a DCC channel, a physical port, and a DCC type;

FIG. 6 is a diagram illustrating an exemplary data structure of setting information;

DESCRIPTION OF EMBODIMENT(S)

Preferred embodiments of the present invention will be explained with reference to accompanying drawings. The embodiments do not limit the scope of the invention.

Prior to the description of the transport apparatus in accordance with the embodiment, a format of optical signals (SONET frame) that are transmitted and received on a SONET/SDH (Synchronous Optical NETwork/Synchronous Digital Hierarchy) is described and, furthermore, configurations of a conventional transport apparatus with a centralized control configuration and a conventional transport apparatus with a dispersed control configuration are described.

Figure 11:
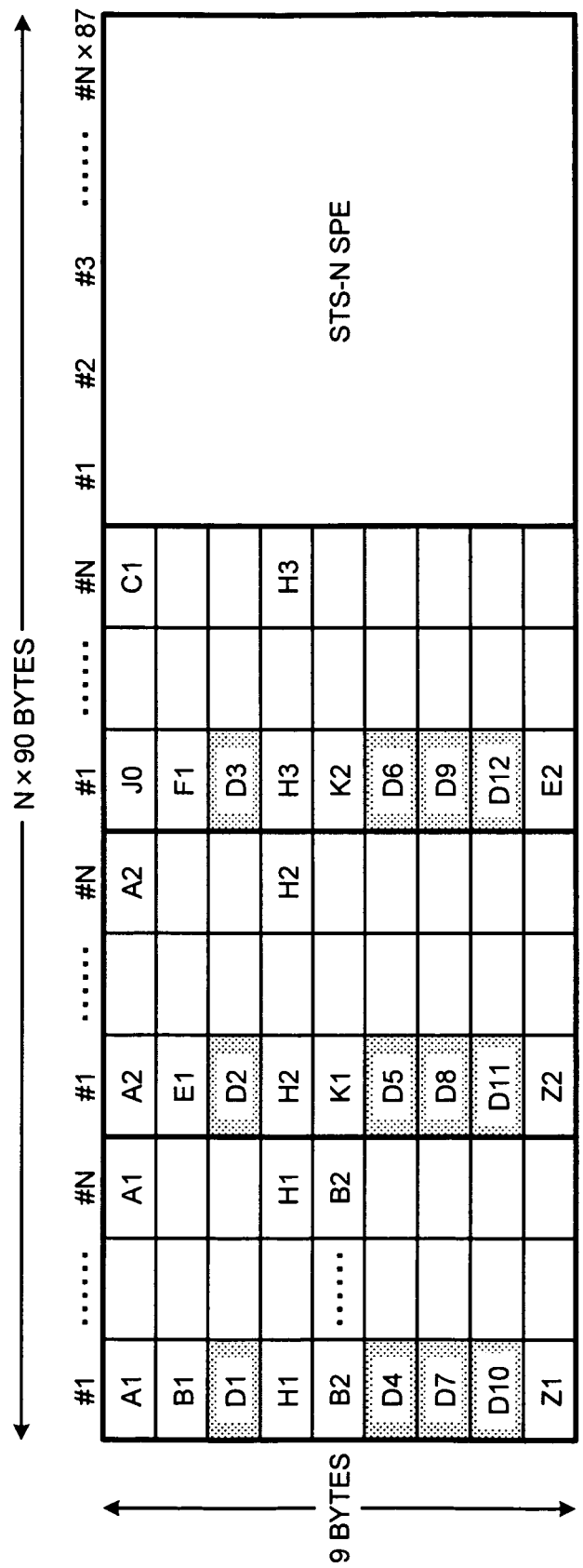
FIG. 11 is a diagram illustrating an exemplary format of an optical signal.

FIG. 11 is a diagram illustrating an exemplary format of an optical signal. In FIG. 11, D1 to D3 bytes are defined as Section DCC, and D4 to D12 bytes are defined as Line DCC. The Section DCC and Line DCC together are defined as Overhead Byte. Monitoring control information for monitoring/controlling the transport apparatuses (NE) within the DCN and the like are allotted to the Overhead Byte (the DCN is constituted in the DCC (Data Communication Channel) in a frame format on optical signal interfaces that are terminated among the NEs and is used for monitoring networks and apparatuses and transporting control information).

Figure 12:
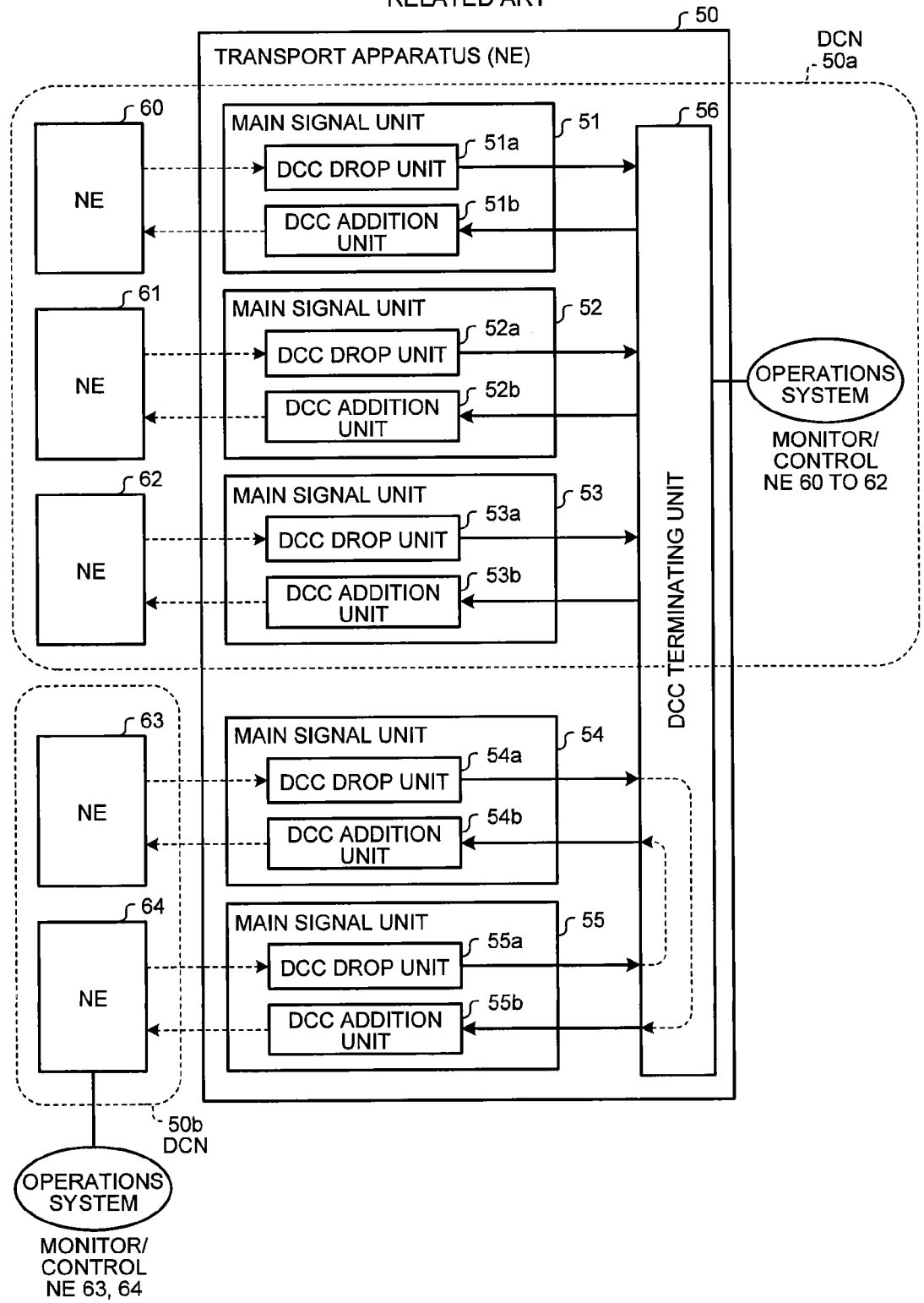
FIG. 12 is a functional block diagram illustrating a configuration of a conventional transport apparatus with a centralized control configuration.

A configuration of a conventional transport apparatus (NE) with a centralized control configuration is described. FIG. 12 is a functional block diagram illustrating a configuration of a conventional transport apparatus with a centralized control configuration. As illustrated in FIG. 12, the transport apparatus (NE) 50 includes main signal units 51 to 55, and a DCC terminating unit 56. The transport apparatus 50 is connected with NEs 60 to 64 and is divided into a group with the NEs 60 to 62, 50 (i.e., DCN 50a) and a group with the NEs 63 and 64 (i.e., DCN 50b).

The main signal unit 51 is processing unit for converting optical signals into electrical signals or electrical signals into optical signals and for extracting/inserting monitoring control information from/into the Overhead Byte of optical signals. The main signal unit 51 includes a DCC drop unit 51a and a DCC addition unit 51b (descriptions of the main signal units 52 to 55 are omitted because these descriptions are the same as the description of the main signal unit 51).

The DCC drop unit 51a is a processing unit that, upon receiving an optical signal from the outside, converts the optical signal into an electrical signal and extracts the monitoring control information from the Overhead Byte of the optical signal. The DCC addition unit 51b is a processing unit that, upon obtaining the monitoring control information from the DCC terminating unit 56, inserts the obtained monitoring control information into the Overhead Byte of the optical signal and then outputs the optical signal.

The DCC terminating unit 56 is a processing unit that, upon obtaining the monitoring control information from the main signal units 51 to 55, determines whether the obtained monitoring control information is to be terminated and then terminates the monitoring control information depending on the result of the determination. For example, when the NEs 60 to 64 are divided into groups as illustrated in FIG. 12, the DCC terminating unit 56 performs a termination process on the monitoring control information received from the NEs 60 to 62 and passes the monitoring control information received from the NEs 63 to 64 through itself (i.e., the DCC terminating unit 56 passes the monitoring control information received from the NE 63 through itself to the NE 64 and passes the monitoring control information received from the NE 64 through itself to the NE 63).

As described above, in the transport apparatus 50 with the centralized control configuration, the termination process or the pass-through is performed by a single DCC terminating unit 56, and these processes are to be performed along with various kinds of setting information in the main signal units 51 to 55. Because the load caused on the DCC terminating unit 56 is high, it is preferable that the DCC terminating unit 56 have sufficient performance, which results in a cost increase of the transport apparatus 50.

Figure 13:
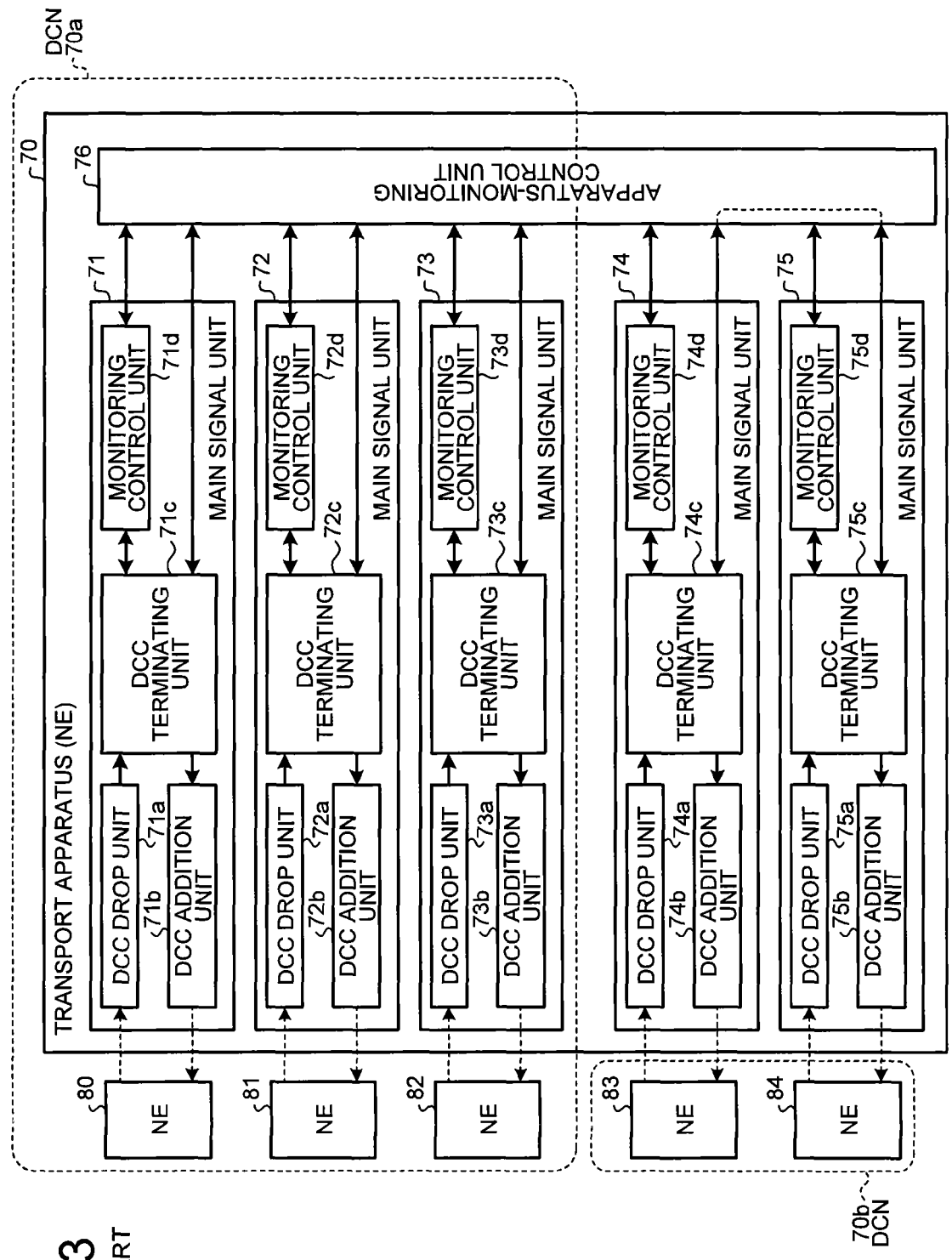
FIG. 13 is a functional block diagram illustrating a configuration of a conventional transport apparatus with a dispersed control configuration.

A configuration of a conventional transport apparatus (NE) with a dispersed control configuration is described. FIG. 13 is a functional block diagram illustrating a configuration of a conventional transport apparatus with a dispersed control configuration. As illustrated in FIG. 13, a transport apparatus 70 includes main signal units 71 to 75, and an apparatus-monitoring control unit 76. The transport apparatus 70 is connected with NEs 80 to 84 and is divided into a group with the NEs 80 to 82, 70 (i.e., DCN 70a) and a group with the NEs 83 and 84 (i.e., DCN 70b).

The main signal unit 71 is a processing unit for converting optical signals into electrical signals or electrical signals into optical signals, for extracting/inserting monitoring control information from/into the Overhead Byte of optical signals, and for determining whether the monitoring control information is to be terminated. The main signal unit 71 includes a DCC drop unit 71a, a DCC addition unit 71b, a DCC terminating unit 71c, and a monitoring control unit 71d (descriptions of the main signal unit 72 to 75 are omitted because these descriptions are the same as the description of the main signal unit 71).

The DCC drop unit 71a is a processing unit that, upon receiving an optical signal from the outside, converts the optical signal into an electrical signal and extracts the monitoring control information from the Overhead Byte of the optical signal. The DCC addition unit 71b is a processing unit that, upon obtaining the monitoring control information from the DCC terminating unit 71c, inserts the obtained monitoring control information into the Overhead Byte of the optical signal and then outputs the optical signal.

The DCC terminating unit 71c is a processing unit that, upon obtaining the monitoring control information from the DCC drop unit, determines whether the monitoring control information is to be terminated and then outputs the monitoring control information to the monitoring control unit 71d or the apparatus-monitoring control unit 76 depending on the result of the determination. When the DCC terminating unit 71c determines that the monitoring control information is to be terminated, the DCC terminating unit 71c outputs the monitoring control information to the monitoring control unit 71d. When the DCC terminating unit 71c determines that the monitoring control information is to be passed through it, the DCC terminating unit 71c outputs the monitoring control information to the apparatus-monitoring control unit 76.

The monitoring control unit 71d is a processing unit that monitors various kinds of information being set in the main signal unit and monitors a state of the main signal unit 71. When the monitoring control unit 71d obtains the monitoring control information, the monitoring control unit 71d transmits the state and the setting information of the main signal unit 71 to the source of the monitoring control information.

The apparatus-monitoring control unit 76 is a processing unit that monitors and controls the entire transport apparatus 70. For example, the apparatus-monitoring control unit 76 monitors the main signal units 71 to 75 by transmitting and receiving various kinds of control information among the monitoring control units 71d to 75d and sets off an alarm if a problem is detected. Furthermore, when the apparatus-monitoring control unit 76 obtains the monitoring control information to be passed through it, the apparatus-monitoring control unit 76 outputs the obtained monitoring control information to the corresponding main signal unit. For example, when the monitoring control information to be passed through it is obtained from the main signal unit 74, the apparatus-monitoring control unit 76 outputs the monitoring control information to the main signal unit 75.

As described above, in the transport apparatus 70 with the dispersed control configuration, each of the main signal units 71 to 75 performs the termination process on the monitoring control information so that the load caused by the termination process can be dispersed. However, the number of signal wires within the transport apparatus 70 is increased and the contents of the processes performed by the processing units become more complex.

A transport apparatus (NE) in accordance with the present embodiment is described. The transport apparatus in accordance with the present embodiment stores the setting information indicating groups to which the NEs belong. When the optical signal is received, it is determined, on the basis of the setting information, whether the monitoring control information is to be terminated. Then, a destination based on the result of the determination is set, and a frame including the monitoring control information is generated. The transport apparatus switches the transmission path of the generated frame using an Ethernet®-frame transmission function and transfers the monitoring control information to the NEs.

As described, the transport apparatus in accordance with the present embodiment sets the destination of the frame on the basis of a result of the determination concerning whether the monitoring control information is to be terminated, switches the transmission path of the frame using the Ethernet®-frame transmission function, and transfers the monitoring control information to the NEs. Therefore, even when the NEs are divided into a plurality of groups, the transport apparatus dose not lose the advantage of the dispersed control configuration that can disperse the load caused on the termination process and can prevent the increase in complexity of the signal wires within the NEs.

Figure 1:
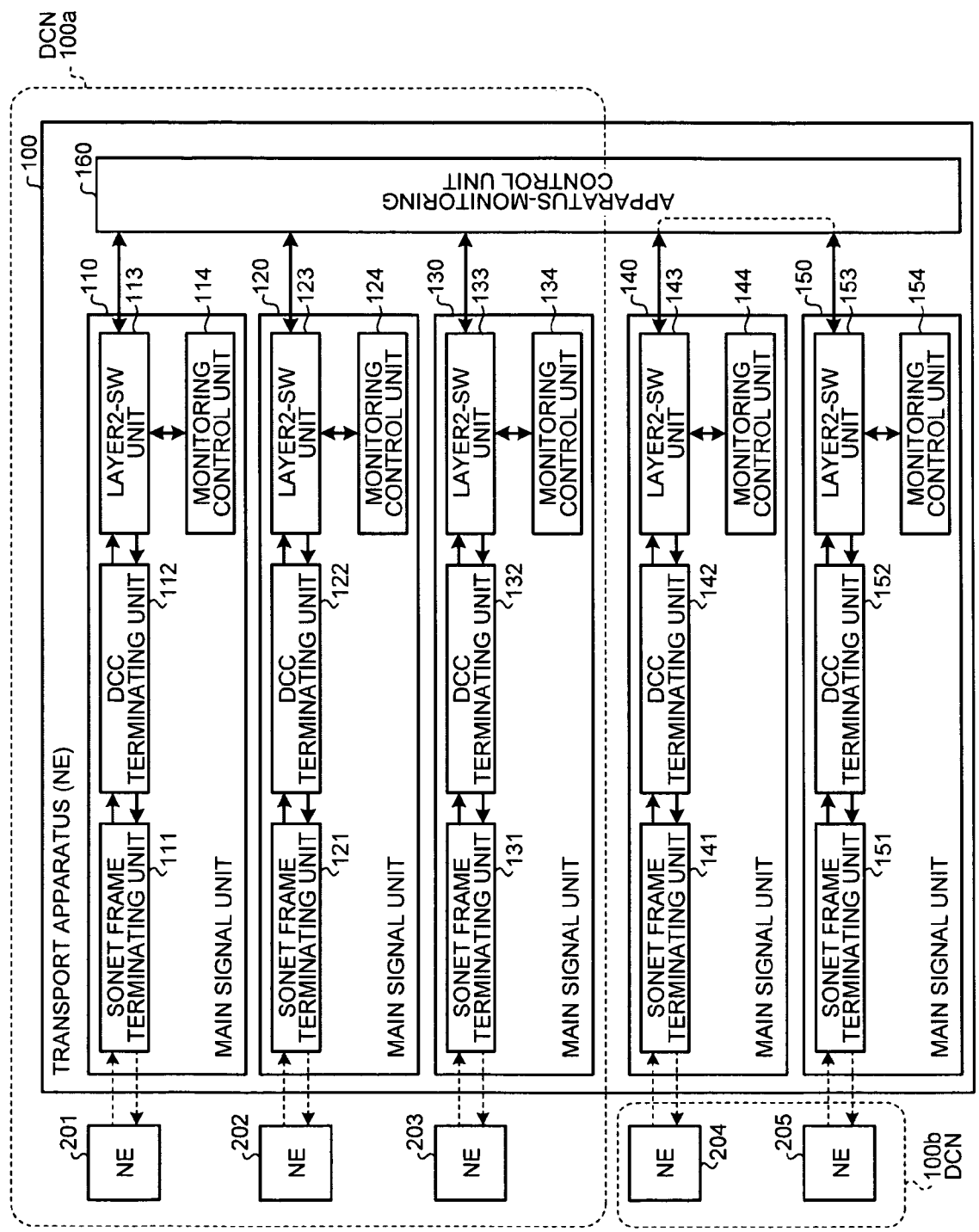
FIG. 1 is a functional block diagram illustrating a configuration of a transport apparatus in accordance with an embodiment.

A configuration of the transport apparatus (NE) in accordance with the present embodiment is described. FIG. 1 is functional block diagram illustrating a configuration of a transport apparatus in accordance with the present embodiment. As illustrated in FIG. 1, a transport apparatus 100 includes main signal units 110 to 150, and an apparatus-monitoring control unit 160. Furthermore, the transport apparatus 100 is connected with NEs 201 to 205 and is divided into a group with NEs 201 to 203, 100 (i.e., DCN 100a) and a group with NEs 204 and 205 (i.e., DCN 100b).

The main signal unit 110 is a processing unit for converting optical signals into electrical signals or electrical signals into optical signals, for extracting/inserting monitoring control information from/into the Overhead Byte of optical signals, for determining whether the monitoring control information is to be terminated and generating a frame, and for switching the path of the frame. The main signal unit 110 includes a SONET frame terminating unit 111, a DCC terminating unit 112, a layer2-SW unit 113, and a monitoring control unit 114 (descriptions of the main signal units 120 to 150 are omitted because these descriptions are the same as the description of the main signal unit 110).

Figure 2:
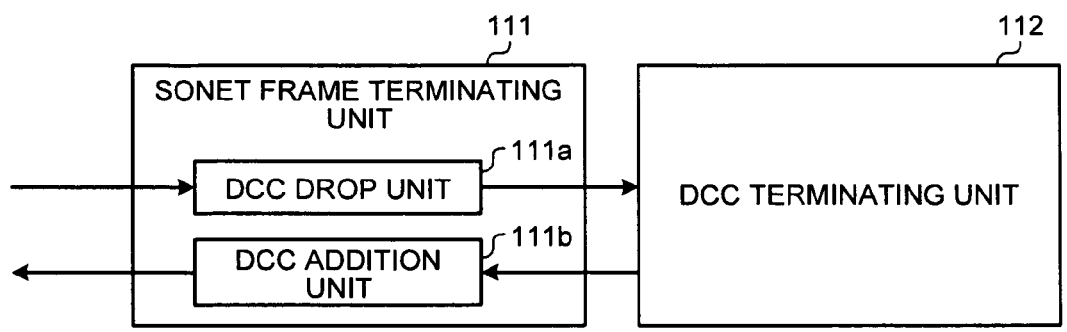
FIG. 2 is a functional block diagram illustrating a configuration of a SONET frame terminating unit.

The SONET frame terminating unit 111 is a processing unit that extracts/inserts the monitoring control information from/into the Overhead Byte in the optical signal. FIG. 2 is a functional block diagram illustrating a configuration of the SONET frame terminating unit 111. As illustrated in FIG. 2, the SONET frame terminating unit 111 includes a DCC drop unit 11a and a DCC addition unit 111b.

When a DCC drop unit 111a obtains an optical signal from the outside, the DCC drop unit 111a extracts D1 to D3 bytes from a frame (SONET frame; see FIG. 11) of the obtained optical signal and generates serial data of 192 Kb/s (or extracts D4 to D12 bytes and generates serial data of 576 Kb/s) and then outputs the generated serial data to the DCC terminating unit 112. The serial data includes the monitoring control information.

A DCC addition unit 111b is a processing unit that, upon obtaining the serial data including the monitoring control information and the like from the DCC terminating unit 112, inserts the obtained serial data into the D1 to D3 bytes of the optical signal (or into the D4 to D12 bytes) and then outputs the optical signal.

Refer back to FIG. 1. The DCC terminating unit 112 is a processing unit that, upon obtaining serial data from the SONET frame terminating unit, determines on the basis of setting information whether the termination process is to be performed and then generates a frame whose destination is set depending on a result of the determination.

Figure 3:
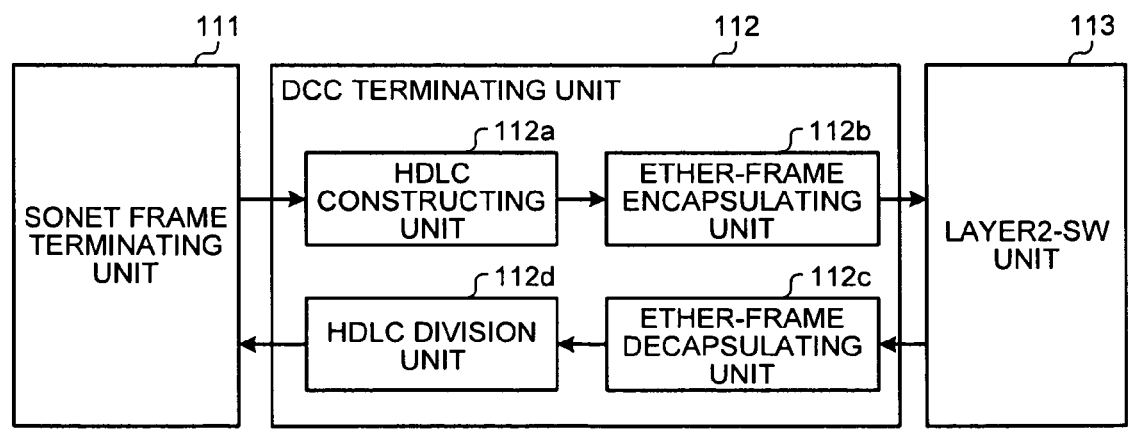
FIG. 3 is a functional block diagram illustrating a configuration of a DCC terminating unit.

FIG. 3 is a functional block diagram illustrating a configuration of the DCC terminating unit 112. As illustrated in FIG. 3, the DCC terminating unit 112 includes an HDLC constructing unit 112a, an ether-frame encapsulating unit 112b, an ether-frame decapsulating unit 112c, and an HDLC division unit 112d.

The HDLC constructing unit 112a is a processing that, upon obtaining serial data from the SONET frame terminating unit 111, extracts an HDLC frame from the obtained serial data. The HDLC frame includes monitoring control information. The HDLC constructing unit 112a outputs the extracted HDLC frame to the ether-frame encapsulating unit 112b.

The ether-frame encapsulating unit 112b is a processing unit that, upon obtaining the HDLC frame, determines on the basis of the obtained HDLD frame and the setting information whether the HDLC frame is to be terminated and then generates an ether-frame depending on a result of the determination.

FIG. 4 is a diagram illustrating an exemplary data structure of an ether frame. As illustrated in FIG. 4, the ether-frame includes Preamble/SFD, Internal DA, Internal SA, Internal VLAN, Type, Data (Logical No, Length, HDLC frame), and FCS.

The Internal DA is an area for storing the MAC address of the destination of an ether frame. The Internal SA is an area for storing the MAC address of an originating host of the ether frame. The Internal VLAN is an area for storing information for identifying VLAN being used.

Furthermore, the Logical No is an area for storing a logical channel number that is allotted to the HDLC frame. For example, when there are eight physical ports and there are two types (DCC type; Section DCC/Line DCC) of monitoring control information for each physical port, there are sixteen logical DCC channels as illustrated in FIG. 5. FIG. 5 is a diagram illustrating relations among DCC channels, physical ports, and DCC types. The Logical No that is set in the ether frame is previously set.

The Length is an area for storing the data length of the HDLC frame. The HDLC frame is an area for storing the HDLC frame itself. The descriptions of Preamble/SFD, Type, and FCS are omitted because these descriptions are the same as the descriptions of Preamble/SFD, Type, and FCS in accordance with conventional ether frames.

The setting information is information for managing group information to which the NEs belong. The destination of the monitoring control information for identifying the NEs and various kinds of information to be set in the ether frame are associated and stored therein. The setting information is updated by a control unit (not illustrated) in the apparatus-monitoring control unit 160 as needed (or at regular intervals). The setting information is stored in the monitoring control unit 114.

FIG. 6 is a diagram illustrating an exemplary data structure of setting information. The setting information includes Logical No, group identification information, destination MAC address, source MAC address, VLAN identification information, and type.

The group identification information is information indicating groups to which the NEs belong. For example, a group DCN 110a corresponds to Group 1 while a group DCN 110b corresponds to Group 2. Thus, the NEs 201 to 203, 100 belong to Group 1 while the NEs 204 and 205 belong to Group 2. Furthermore, the destination MAC address, the source MAC address, the VLAN identification information, and type store various kinds of information being set in the ether frame.

The address "A1" in accordance with the operation system of the destination MAC address corresponds to the MAC address of the monitoring control unit 114 while the address "A2" corresponds to the MAC address of the apparatus-monitoring control unit 160. Furthermore, the address "B1" in accordance with the stand-by system corresponds to the MAC address of a backup apparatus-monitoring control unit (not illustrated) while the address "B2" corresponds to the MAC address of a backup apparatus-monitoring control unit (not illustrated). Furthermore, the source MAC address "C1" corresponds to the MAC address of the DCC terminating unit 112.

Specific processes by the ether-frame encapsulating unit 112b are described with reference to FIG. 6. The ether-frame encapsulating unit 112b refers to the setting information to determine whether the destination of the monitoring control information belongs to the Group 1 or Group 2 (e.g., in this case, the monitoring control information includes information of destination Group).

When the destination of the monitoring control information belongs to Group 1, i.e., belongs to the same group as the transport apparatus 100 of its own, the ether-frame encapsulating unit 112b determines that the monitoring control information is to be terminated and generates an ether frame depending on the result of the determination. Specifically, for the ether frame, the ether-frame encapsulating unit 112b sets the destination MAC address "A1", the source MAC address "C1", the VLAN identification information, and the type in the first row in FIG. 6. When the operation system of the monitoring control unit 114 is broken, the destination MAC address is set as "B1". The ether frame, set as above, is output to the monitoring control unit 114 via the Layer2-SW unit 113.

When the NE, the destination of the monitoring control information, belongs to Group 2, i.e., does not belong to the same group as the transport apparatus 100 of its own, the ether-frame encapsulating unit 112b determines that the monitoring control information is to be passed through it and then generates an ether frame depending on the result of the determination. Specifically, for the ether frame, the ether-frame encapsulating unit 112b sets the destination MAC address "A2", the source MAC address "C2", the VLAN identification information, and the type in the second row in FIG. 6. When the operation system of the apparatus-monitoring control unit 160 is broken, the destination MAC address is set as "B2". The ether frame, set as above, is output to the apparatus-monitoring control unit 160 via the Layer2-SW unit 113.

The ether-frame decapsulating unit 112c is a processing unit that, upon obtaining the ether frame from the Layer2-SW unit 113, decapsulates the ether frame. Specifically, the ether-frame decapsulating unit 112c extracts information stored in Data (see FIG. 4) in the ether frame and reads the frame length of the HDLC frame from the Length area.

The ether-frame decapsulating unit 112c extracts data of the read frame length from the HDLC frame and outputs the extracted HDLC frame to the HDLC division unit 112d. The ether-frame decapsulating unit 112c refers to Logical No and determines whether the HDLC frame is to be inserted into the optical signal as the Section DCC and whether the HDLC frame is to be inserted into the optical signal as the Line DCC and then outputs the result of the determination to the HDLC division unit 112d.

When the Logical No is within the range from 1 to 8, the ether-frame decapsulating unit 112c determines that the HDLC frame is to be inserted into the optical signal as the Section DCC (i.e., the HDLC frame is divided and inserted into the D1 to D3 bytes in the optical signal). When the Logical No is within the range from 9 to 16, the ether-frame decapsulating unit 112c determines that the HDLC frame is to be inserted into the optical signal as the Line DCC (i.e., the HDLC frame is divided and inserted into the D4 to D12 bytes in the optical signal).

The HDLC division unit 112d is a processing unit that, upon obtaining the HDLC frame, divides the obtained HDLC frame, inserts the HDLC frame, which is divided into the D1 to D3 bytes in the optical signal or divided into the D4 to D12 bytes in the optical signal depending on the result of the determination performed by the ether-frame decapsulating unit 112c, and then outputs the optical signal.

Refer back to the description of FIG. 1. The Layer2-SW unit 113 is a processing unit (layer2 switch) that, upon receiving the ether frame, outputs the ether frame to the DCC terminating unit 112, the monitoring control unit 114, or the apparatus-monitoring control unit 160 depending on the destination MAC address in the ether frame.

Specifically, when the destination MAC address in the ether frame is "A1", the Layer2-SW unit 113 outputs the ether frame to the monitoring control unit 114. When the destination MAC address in the ether frame is "A2", the Layer2-SW unit 113 outputs the ether frame to the apparatus-monitoring control unit 160. When the destination MAC address in the ether frame is "C1", the Layer2-SW unit 113 outputs the ether frame to the DCC terminating unit 112.

The monitoring control unit 114 is a processing unit that monitors various kinds of information being set in the main signal unit 110 and monitors a state of the main signal unit 110. When the ether frame is obtained (i.e., when the monitoring control information included in the ether frame is obtained), the monitoring control unit 114 transmits the state and various kinds of setting information of the main signal unit 110 (transmitted via the DCC terminating unit 112 and the SONET frame terminating unit 111). Furthermore, the monitoring control unit 114 transmits/receives, using an ether frame, various kinds of control information to/from the apparatus-monitoring control unit 160.

The apparatus-monitoring control unit 160 is an apparatus that monitors/controls the entire transport apparatus 100. For example, the apparatus-monitoring control unit 160 transmits/receives various kinds of control information to/from the main signal units 110 to 150 so as to monitor the main signal units 110 to 150. Then, when a problem is detected, the apparatus-monitoring control unit 160 sets off an alarm. Furthermore, when an ether frame to be passed through it is obtained, the apparatus-monitoring control unit 160 outputs the ether frame to the main signal unit to which the obtained ether frame is to be output.

The apparatus-monitoring control unit 160 stores, for example, a correspondence table between the destination of the monitoring control information included in the ether frame and the destination MAC address corresponding to said destination. The apparatus-monitoring control unit 160 compares the destination of the monitoring control information with the correspondence table, determines the main signal unit to which the ether frame is to be transmitted, and, on the basis of the result of the determination, outputs the ether frame.

For example, when the apparatus-monitoring control unit 160 obtains, from the main signal unit 140, an ether frame including the monitoring control information whose destination is the NE 205, the apparatus-monitoring control unit 160 outputs the ether frame to the main signal unit 150 so that the monitoring control information is passed through it.

Figure 7:
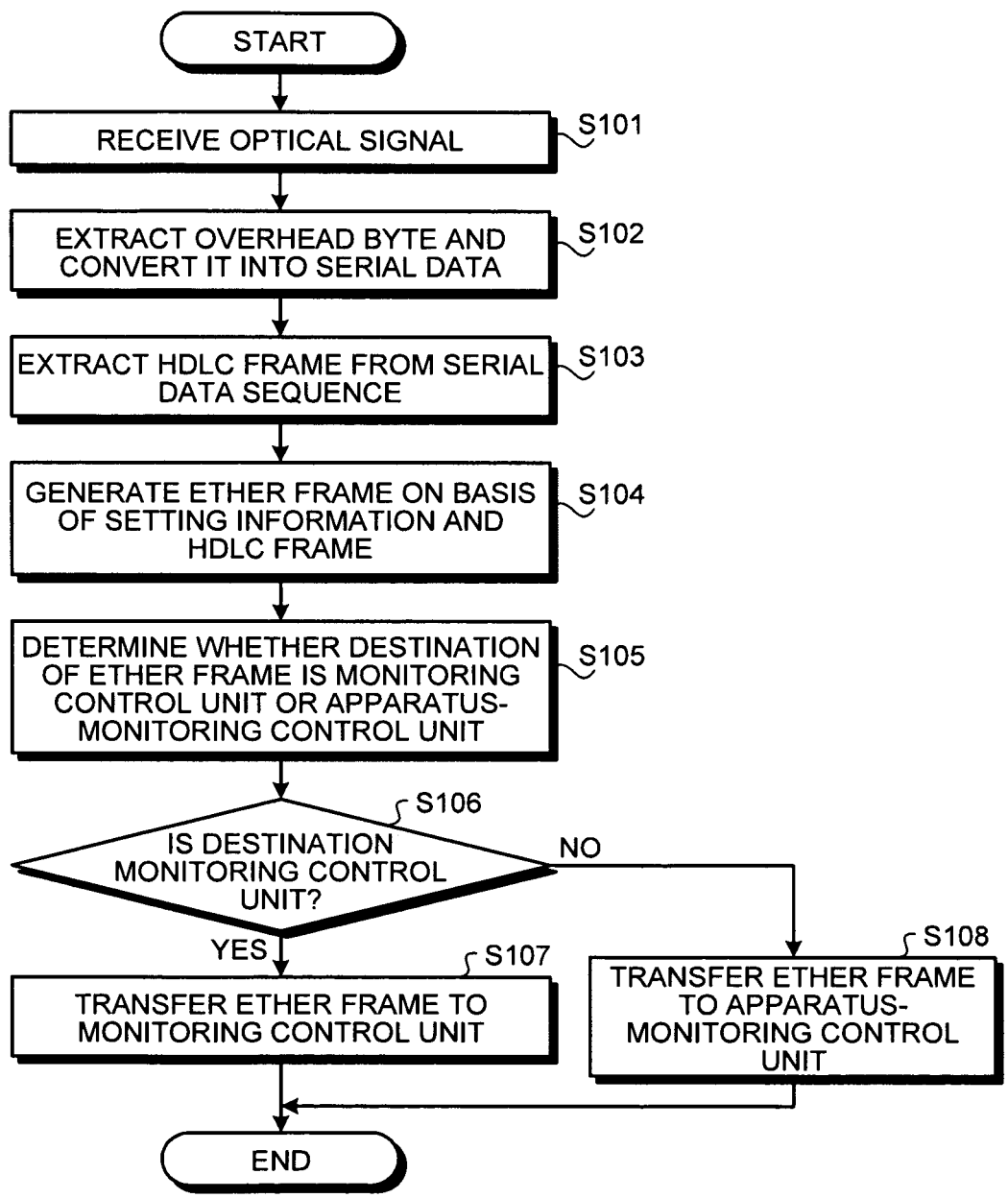
FIG. 7 is a flowchart illustrating reception processes by a transport apparatus in accordance with an embodiment.

Reception processes in the transport apparatus 100 in accordance with the present embodiment are described. FIG. 7 is a flowchart illustrating reception processes in the transport apparatus 100 in accordance with the present embodiment. As illustrated in FIG. 7, in the transport apparatus 100, the SONET frame terminating unit 111 receives the optical signals (Step S101), extracts the Overhead Byte in the optical signal, and converts the same into serial data (Step S102). The SONET frame terminating unit 111 extracts the HDLC frame from the serial data sequence (Step S103).

The DCC terminating unit 112 generates the ether frame on the basis of the setting information and the HDLC frame (Step S104). The Layer2-SW unit 113 determines whether the destination of the ether frame is the monitoring control unit 114 or the apparatus-monitoring control unit 160 (Step S105).

When the destination of the ether frame is the monitoring control unit 114 (Step S106: Yes), the Layer2-SW unit 113 transfers the ether frame to the monitoring control unit 114 (Step S107). When the destination of the ether frame is the apparatus-monitoring control unit 160 (Step S106: No), the Layer2-SW unit 113 transfers the ether frame to the apparatus-monitoring control unit 160 (Step S108).

As described above, in the transport apparatus 100, the DCC terminating unit 112 determines whether the frame including the monitoring control information is to be terminated, sets the destination of the ether frame on the basis of the result of the determination, and then outputs the ether frame to the Layer2-SW unit 113. In this manner, processes for termination or passing-through of the frame can be simplified. In the flowchart illustrated in FIG. 7, the reception processes are described with reference to the components of the main signal unit 110. Not limited to this, the same processes can be performed with the main signal units 120 to 150 as well.

Figure 8:
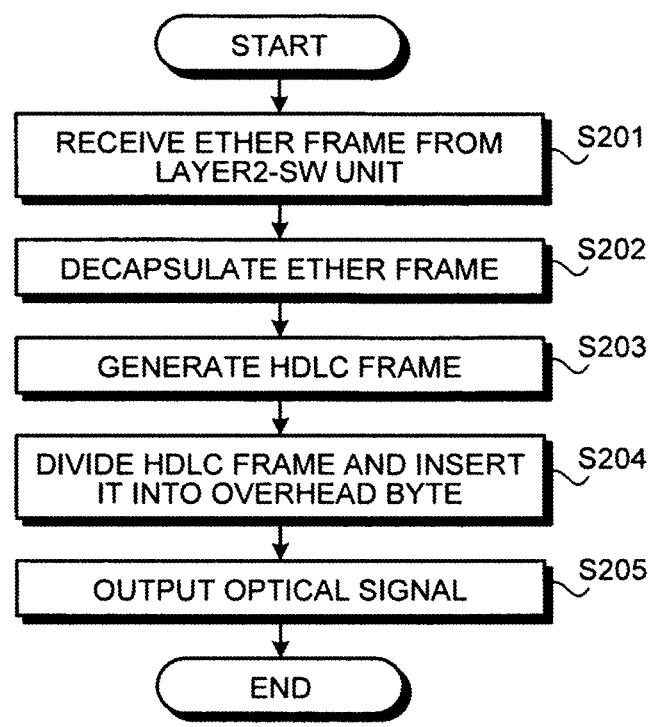
FIG. 8 is a flowchart illustrating transmission processes by a transport apparatus in accordance with an embodiment.
Figure 9:
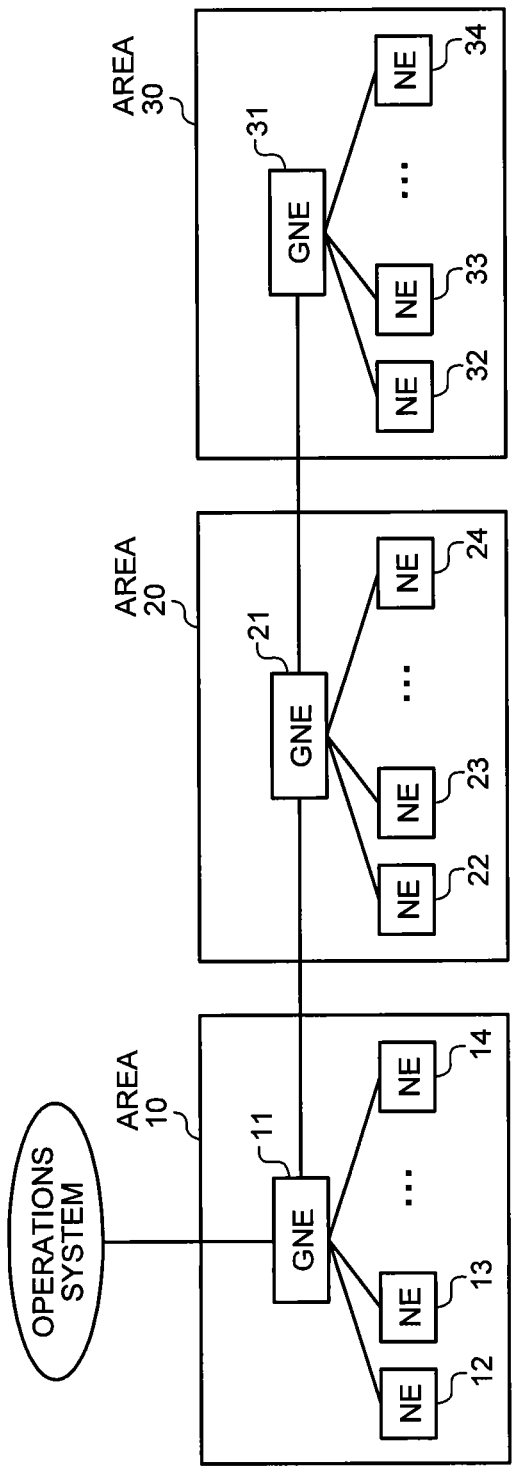
FIG. 9 is a diagram illustrating a configuration of a conventional DCN.
Figure 10:
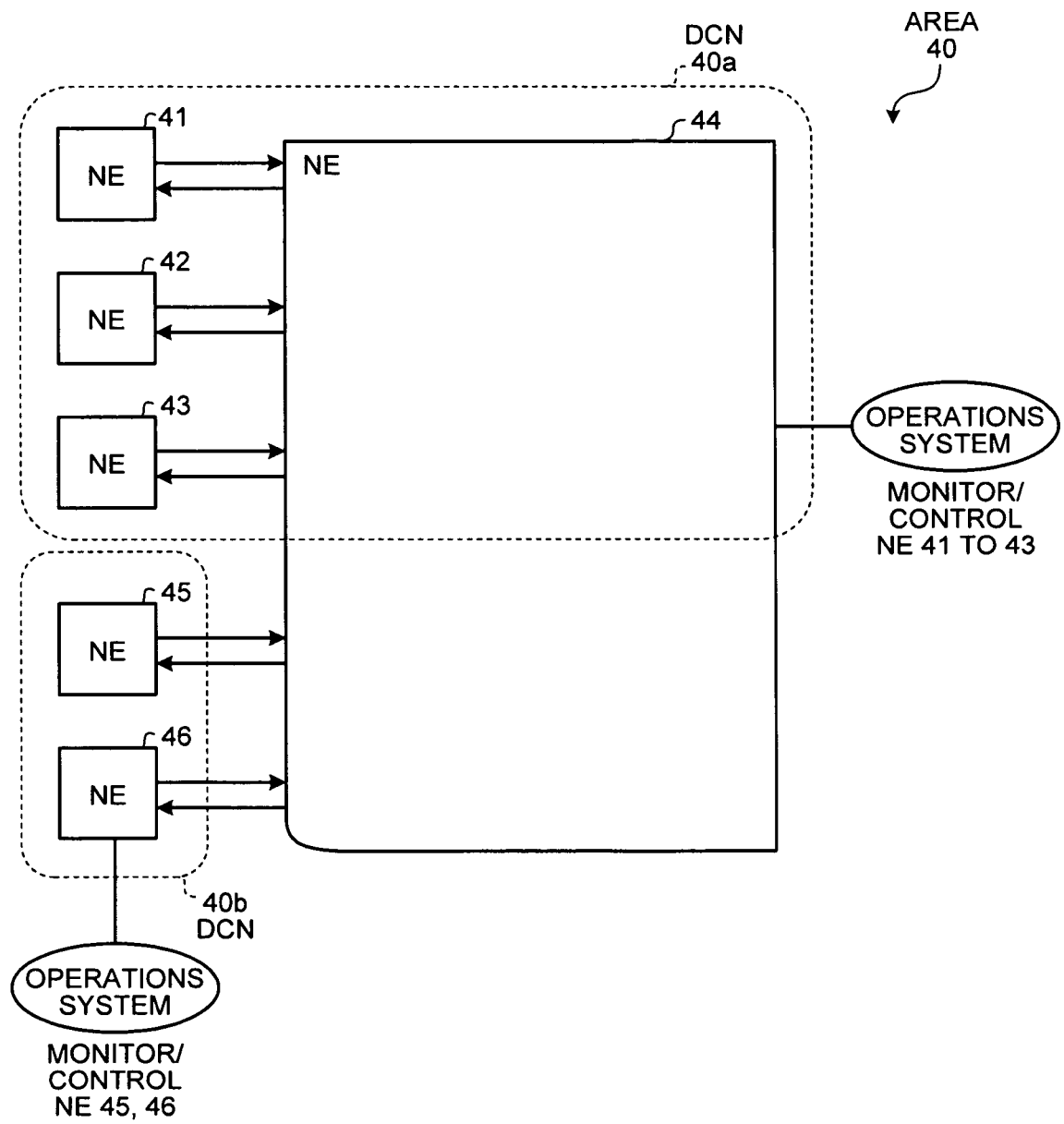
FIG. 10 is a diagram illustrating a division of DCN.

Transmission processes in the transport apparatus 100 in accordance with the present embodiment are described. FIG. 8 is a flowchart illustrating transmission processes in the transport apparatus 100 in accordance with the present embodiment. As illustrated in FIG. 8, in the transport apparatus 100, the DCC terminating unit 112 receives the ether frame from the Layer2-SW unit 113 (Step S201) and decapsulates the ether frame (Step S202).

The DCC terminating unit 112 then generates the HDLC frame (Step S203). The SONET frame terminating unit 111 divides the HDLC frame, inserts the divided HDLC frame into the Overhead Byte in the optical signal (into the D1 to D3 bytes in the optical signal or D4 to D12 bytes in the optical signal) (Step S204), and then outputs the optical signal (Step S205).

As described above, the transport apparatus 100 transmits the monitoring control information using the ether frame. In this manner, the processes for the transmission of control information can be simplified and load caused on the main signal unit can be reduced. In the flowchart illustrated in FIG. 8, the transmission processes are described with reference to the components of the main signal unit 110. Not limited to this, the same processes can be performed with the main signal units 120 to 150 as well.

As described above, the transport apparatus in accordance with the present embodiment stores therein the setting information that indicates a group to which the NEs belong. When the optical signal is received, the transport apparatus 100 determines, on the basis of the setting information, whether the monitoring control information is to be terminated, sets the destination depending on the result of the determination, and then generates the ether frame including the monitoring control information. The transport apparatus 100 switches, using the Ethernet®-frame transmission function, the transmission path of the generated frame and transfers the monitoring control information to the NEs. In this manner, even when the NEs are divided into a plurality of groups, the transport apparatus 100 dose not lose the advantage of the dispersed control configuration that can disperse the load caused on the termination process and can prevent the increase in complexity of the signal wires within the NEs.

In the processes described in the present embodiment, all or some processes, described as automatically performed, may be performed manually, and all or some processes, described as manually performed, may be performed automatically with known methods. Furthermore, procedures, control procedures, specific names, information including various kinds of data and parameters that are illustrated in the above descriptions or in the figures may be arbitrarily modified except as otherwise provided.

Furthermore, the components of the transport apparatus 100 illustrated in FIG. 1 are merely functional concepts, and the physical configurations of these components are not necessarily the same as those illustrated. Depending on various kinds of load and operation statuses, all or some of the apparatuses may be functionally or physically integrated/disintegrated into an arbitrary unit. Furthermore, all or some of the processing functions in the apparatuses may be realized with a CPU and programs that are analyzed and executed by the CPU or with hardware based on wired logic.

According to an embodiment, the setting information indicating a group to which a plurality of apparatuses within the area belongs is stored. When the optical signal is received, it is determined, on the basis of the setting information, whether the control information is to be terminated or passed through. The destination based on the result of the determination is set and the frame including the control information is generated. On the basis of the destination of the frame, the path of the frame is switched. Therefore, even when the transport apparatuses (NE) are divided into a plurality of groups, an advantage with the dispersed control configuration that can disperse the load caused for the termination process is not lost, and an increase in complexity of the signal wires within the NEs can be prevented.

Furthermore, according to an embodiment, the function of the layer2 switch is realized and the path of the frame is switched on the basis of the destination set in the frame. Therefore, the termination process or passing-through process on the control information can be simplified.

Furthermore, according to an embodiment, the frame generating unit allots a logical channel to the frame. Therefore, the terminating process and passing-through process on the information can be efficiently performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transport apparatus comprising:
a plurality of transport processing units that transport a plurality of optical signals on an optical network and which control, by transmitting or receiving the optical signals including control information, apparatuses that are managed on the basis of areas, each transport processing unit including
a setting-information storage unit that stores therein setting information indicating a group to which a plurality of apparatuses within one of the plurality of areas belongs,
a frame generating unit that, upon receiving one of the plurality of optical signals, determines on the basis of the setting information whether the control information is to be terminated or to be passed through itself, sets a destination depending on the result of the determination, and generates a frame including the control information, and
a path switching unit that switches a path of the frame on the basis of the destination of the frame.

2. The transport apparatus according to claim 1, wherein the path switching unit comprises a function of a layer2 switch and switches the path of the frame on the basis of the destination set in the frame.

3. The transport apparatus according to claim 1, wherein the frame generating unit allots a logical channel to the frame.

* * * * *